United States Patent [19]

Slaughter

[11] Patent Number: 4,981,234

[45] Date of Patent: Jan. 1, 1991

[54] FOOD CONTAINER

[75] Inventor: Marion W. Slaughter, Houston, Tex.

[73] Assignee: Kreme Kool, Inc., Houston, Tex.

[21] Appl. No.: 407,852

[22] Filed: Sep. 14, 1989

Related U.S. Application Data

[63] Continuation-in-part of Ser. No. 306,078, Feb. 6, 1989.

[51] Int. Cl.⁵ .............................................. F25D 3/00
[52] U.S. Cl. .................................... 220/415; 62/457.1; 62/438
[58] Field of Search ............... 220/415; 62/1, 66, 451, 62/530, 528, 114, 438

[56] References Cited

U.S. PATENT DOCUMENTS

| | | | |
|---|---|---|---|
| 2,526,165 | 10/1950 | Smith | 215/12.1 |
| 2,622,415 | 12/1952 | Landers et al. | 215/13.1 |
| 3,394,562 | 7/1968 | Coleman | 215/13.1 |
| 3,715,895 | 2/1973 | Devlin | 62/457 |
| 3,755,030 | 8/1973 | Doman et al. | 156/73 |
| 4,789,073 | 12/1988 | Fine | 215/13.1 |

*Primary Examiner*—Joseph Man-Fu Moy
*Attorney, Agent, or Firm*—Bill B. Berryhill

[57] ABSTRACT

An improved food container for maintaining food at reduced temperatures having an upper opening inner shell surrounded by an outer shell between which is a cavity filled with a gelatinous blend of amorphous natural high-polymer carbohydrates. In a preferred embodiment the inner surface of the outer shell is at least partially covered by a material of closed-cell plastic foam.

11 Claims, 1 Drawing Sheet

U.S. Patent
Jan. 1, 1991
4,981,234
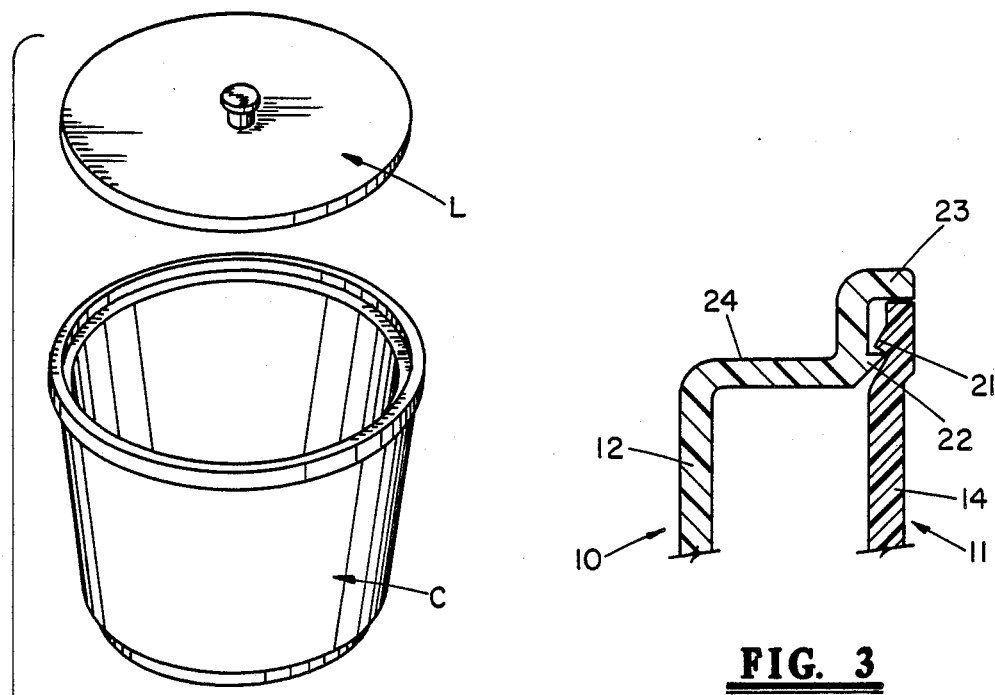
FIG. 1
FIG. 3
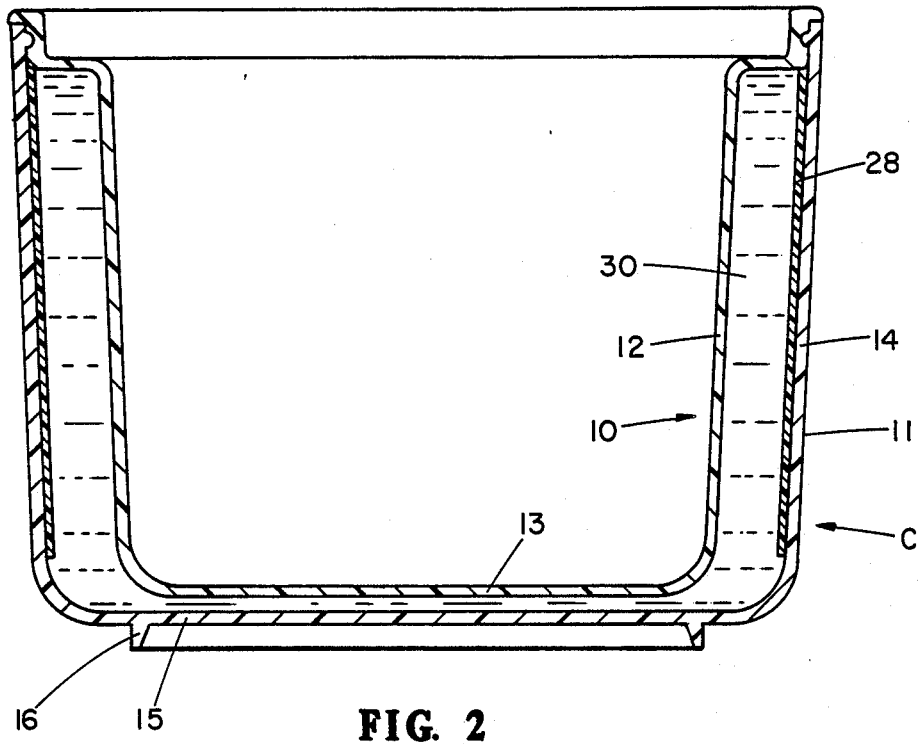
FIG. 2

FOOD CONTAINER

CROSS REFERENCE TO RELATED APPLICATION

This is a continuation-in-part of Application Ser. No. 306,078, filed Feb. 6, 1989.

BACKGROUND OF THE INVENTION

1. Field of the Invention

The present invention pertains to food and/or beverage receptacles. More specifically, the present invention pertains to receptacles for containing food and/or beverages and maintaining the same at reduced temperatures.

2. Description of Prior Art

Many foods must be refrigerated or kept below a certain temperature to prevent spoilage or contamination. This is a particularly important problem which must be addressed in restaurants or other food facilities. In fact, various health laws and regulations require that certain foods be stored and/or maintained below specified temperatures.

In some facilities, various foods may be contained in receptacles which are surrounded by ice. There are a number of problems associated with this procedure. Ice melts quickly and must be constantly replenished. Disposal of the water from melted ice is messy and time consuming. The handling of ice and melted water around foods may also result in contamination of the food.

In an effort to avoid the problems associated with surrounding melting ice and water, food and/or beverage receptacles have been developed in which the ice and/or water is isolated in an enclosed space surrounding the food receptacle. Examples of some of the earlier developments in this area may be seen in U.S. Pat. Nos. 1,519,034; 1,771,186; 2,526,165; and 2,622,415.

In latter developments, food containers have been developed which not only provide a surrounding enclosed space for some type of refrigerant but also provide additional insulating or heat transfer characteristics. For example, one wall of the container of U.S. Pat. No. 3,394,562, which is of aluminum, is coated with plastic. In U.S. Pat. No. 3,715,895, the enclosed space surrounding the receptacle is filled with a refreezable aqueous refrigerant which has a freezing point substantially below the freezing point of water, e.g. propylene glycol. Other containers depend on specific insulating or sealing characteristics. See U.S. Pat. Nos. 3,755,030 and 4,789,073.

Thus, the search continues for cooling food containers which will maintain food and/or beverages at reduced temperatures for relatively long periods of time and which are easy to use, clean and maintain. Containers which are portable and relatively inexpensive are particularly desired.

SUMMARY OF THE PRESENT INVENTION

The present invention is an improved food container for maintaining food at a reduced temperature over a relatively long period of time. The container may include an upper opening inner shell receptacle surrounded by an outer shell and between which is defined a cavity. The cavity is filled with a slow-to-freeze, slow-to-thaw, gelatinous material of a special composition. In addition, the inner surface of the outer shell may be at least partially covered by a material of closed-cell plastic foam. This unique combination results in a food container which will maintain foods placed therein at reduced temperature for relatively long periods of time.

In addition to its superior cooling qualities, the food container of the present invention is portable, easy to use, clean and maintain. Many other objects of the invention will be apparent from reading the description which follows in conjunction of the accompanying drawings.

BRIEF DESCRIPTION OF THE DRAWINGS

FIG. 1 is a perspective view of an improved food container, shown with a lid or closure member, according to a preferred embodiment of the invention;

FIG. 2 is a sectional elevation view of a food container, according to a preferred embodiment of the invention; and FIG. 3 is a detailed section of a portion of the food container of the present invention, illustrating connection of various components thereof.

DESCRIPTION OF A PREFERRED EMBODIMENT

Referring now to the drawings, there is shown an upper opening food container C in which food or beverages may be deposited and maintained at reduced temperatures for a relatively long period of time. As illustrated in FIG. 1, a closure member or lid L may also be provided for selective closing or covering of the container C. The container C may be utilized with or without such a lid L.

Referring particularly to FIG. 2, the container C is preferable made of an inner shell or food receptacle 10 surrounded by an outer shell 11 between which is a cavity. The inner shell 10 comprises an inner wall 12 joined to an upper bottom 13. The outer shell 11 comprises an outer wall 14 joined to a lower bottom 15. The lower bottom 15 may be provided with a circular ridge of projection 16 on which the entire container C may be supported.

Referring to FIG. 3, the upper edges of the shells 10 and 11 are joined s that the cavity therebetween is hermetically sealed. Any type of joint design may be utilized. In the one shown, the outer wall 14 is provided with an inclined inner ridge 21 the underside of which is engaged by an outer projection or ridge 22 on the inner shell 10. A flange-like extension 23 on the inner shell 10 rests on the upper edge of the outer shell 11. The inner shell 10 also provides a surface 24 on which a closure member such as the lid L of FIG. 1 may rest. Assembly of the inner and outer shells 10, 11, respectively, may be accomplished simply by placing the inner shell 10 within the outer shell 11 and directing a downward force on the inner shell until the projection 22 slides by the ridge 21, springing out to engage the downwardly facing surface of ridge 21.

Filling the enclosed and hermetically sealed cavity between the inner and outer shells 10 and 11 is a specially developed slow-to-freeze, slow-to-thaw gelatinous material 30. Preferably, this material is a blend of amorphous natural high-polymer carbohydrates comprising long chains of glucose rings hooked together by oxygen bridges containing the univalent group OH. A highly enzymatic resistance in the final formulation is desired.

The inner and outer shells 10 and 11 are of a plastic material, preferably polypropylene. In a preferred embodiment, the inner surface of the outer shell wall 14 is covered with an insulating material of closed-cell plastic foam 28, preferably closed-celled polyethelene.

In use, the container C is placed in a freezer for a long enough period of time to freeze the gelatinous material 30 in the enclosed cavity thereof. After freezing, the container may be filled with the food to be placed therein. All types of food and/or beverages may be placed in the container C. It is especially desirable for containing small individual coffee cream containers, butter pats, sliced lemons, salad dressings and other salad bar condiments. Tests have demonstrated that individual coffee creamers may be maintained at suitably reduced temperatures (45° F.) in excess of eight hours. The unique combination of refrigerant gel and closed-celled insulating plastic results in a highly efficient and effective cooling container. Not only is the container of the present invention efficient in cooling, it is easy to clean, use and maintain.

A single embodiment of the invention has been described herein. However, many variations of the invention can be made without departing from the spirit of the invention. Accordingly, it is intended that the scope of the invention be limited only by the claims which follow.

What is claimed is:

1. An improved food container for maintaining food at reduced temperatures for relatively long periods of time, said container comprising an upper opening inner shell food receptacle surrounded by an outer shell between which is a cavity filled with a gelatinous blend of amorphous natural high-polymer carbohydrates which, when frozen, will maintain food placed in said container at a temperature of 45° F. or less for a period of up to eight hours.

2. The improved food container of claim 1 in which the surface of said outer wall which faces said enclosed cavity is covered by a material of closed-cell polyethylene foam.

3. The improved food container of claim 2 in which said inner and outer walls are made of polypropylene.

4. The improved food container of claim 1 in which said bottom means comprises spaced apart upper and lower bottoms which are continuations of said inner and outer walls, respectively, and the space between which forms part of said enclosed cavity which is filled with said gelatinous blend of amorphous natural high-polymer carbohydrates.

5. The improved food container of claim 1 including closure means for selective closing and opening of said receptacle.

6. An improved food container for maintaining food at reduced temperatures for relatively long periods of time, said container comprising an upper opening inner shell food receptable surrounded by an outer shell between which is a cavity filled with a gelatinous blend of amorphous natural high-polymer carbohydrates.

7. An improved food container as set forth in claim 6 in which the upper edges of said inner and outer shells are joined so that said cavity is hermetically sealed.

8. An improved food container as set forth in claim 6 in which said inner and outer shells are made of polypropylene.

9. An improved food container as set forth in claim 8 in which the inner surface of said outer shell is at least partially covered by a material of closed-cell polyethylene foam.

10. An improved food container as set forth in claim 6 in which the inner surface of said outer shell is at least partially covered by a material of closed-cell plastic foam.

11. An improved food container a set forth in claim 6 in which said gelatinous blend of amorphorus natural high-polymer carbohydrates comprises long chains of glucose rings hooked together by oxygen bridges containing the univalent group OH.

* * * * *

UNITED STATES PATENT AND TRADEMARK OFFICE
CERTIFICATE OF CORRECTION

PATENT NO.   :  4,981,234
DATED        :  January 1, 1991
INVENTOR(S)  :  Marion W. Slaughter It is certified that error appears in the above-identified patent and that said Letters Patent is hereby corrected as shown below:

Columns 3 and 4:
 Claims 1 and 6 are corrected to read as follows:

1. An improved food container for maintaining food at reduced temperatures for relatively long periods of time, said container having continuous wall means and closed bottom means defining an upper opening receptacle for said food, said wall means comprising an inner wall and spaced therefrom a surrounding outer wall leaving an enclosed cavity therebetween, said enclosed cavity being filled with a gelatinous blend of amorphous natural high-polymer carbohydrates comprising long chains of glucose rings hooked together by oxygen bridges containing the univalent group OH.

6. An improved food container for maintaining food at reduced temperatures for relatively long periods of time, said container comprising an upper opening inner shell food receptacle surrounded by an outer shell between which is a cavity filled with a gelatinous blend of amorphous natural high-polymer carbohydrates which, when frozen, will maintain food placed in said container at a temperature of 45° F or less for a period of up to eight hours.

Signed and Sealed this

Seventh Day of June, 1994

*Attest:*

BRUCE LEHMAN

*Attesting Officer*   Commissioner of Patents and Trademarks